United States Patent

Wagner

[15] 3,638,542
[45] Feb. 1, 1972

[54] PHOTOGRAPHIC CAMERA WITH AUTOMATIC EXPOSURE CONTROL

[72] Inventor: Karl Wagner, Ottobrunn, Germany
[73] Assignee: Agfa-Gevaert Aktiengesellschaft, Leverkusen, Germany
[22] Filed: Mar. 26, 1970
[21] Appl. No.: 22,773

[30] Foreign Application Priority Data

Mar. 28, 1969 Germany..................P 19 15 871.5

[52] U.S. Cl. ............................................95/10 CT, 95/53 EB
[51] Int. Cl. ................................................................G03b 7/08
[58] Field of Search ................95/10 C, 53 E, 53 EA, 53 EB, 95/10 CE, 10 CT

[56] References Cited

UNITED STATES PATENTS

| 3,063,354 | 11/1962 | Matulik | 95/10 C |
| 3,460,450 | 8/1969 | Mamoru Ogihara | 95/10 C |
| 3,460,451 | 8/1969 | Starp et al. | 95/10 C |

*Primary Examiner*—Joseph F. Peters, Jr.
*Attorney*—Michael S. Striker

[57] ABSTRACT

An exposure control for photographic cameras wherein a ring-shaped setting member can influence the exposure of a photosensitive resistor to scene light as a function of film speed and is also designed to connect in the exposure control circuit a resistor which is variable as a function of the film speed. The influencing of the exposure of photosensitive receiver to scene light accounts for the film speed during exposures in daylight and the variable resistor influences the exposure time when an exposure is made with artificial illumination of the subject or scene.

15 Claims, 3 Drawing Figures

INVENTOR.
KARL WAGNER 3,638,542

1

PHOTOGRAPHIC CAMERA WITH AUTOMATIC EXPOSURE CONTROL

BACKGROUND OF THE INVENTION

The present invention relates to improvements in exposure controls for photographic apparatus. More particularly, the invention relates to improvements in automatic exposure controls for use in cameras which can be loaded with two or more types of film each having a different speed.

It is already known to adjust the exposure control in a photographic camera in dependency on the speed of film, for example, by changing the extent to which a photosensitive receiver of the exposure control is exposed to scene light or by connecting an auxiliary capacitor in circuit with the customary capacitor of the exposure control circuit. Such adjustments are carried out in order to account for the film speed prior to making of an exposure in daylight. For exposures with artificial illumination of the subject or scene, the user of the camera must adjust the diaphragm in order to account for a particular film speed.

SUMMARY OF THE INVENTION

An object of the invention is to provide an exposure control wherein the adjustment to take into account a particular film speed for exposures in daylight or artificial light is carried out in a novel and improved way by resorting to a small number of simple, compact and inexpensive parts.

Another object of the invention is to provide an exposure control which can be adjusted to account for a particular film speed prior to exposing in artificial light without necessitating an adjustment of the diaphragm.

A further object of the invention is to provide an exposure control wherein the part which is manipulated to account for a particular film speed during exposures in daylight also serves as a means for effecting appropriate adjustments as a function of film speed when the user wishes to make one or more exposures with artificial illumination of the scene or subject.

An additional object of the invention is to provide a novel circuit for automatic exposure controls in still cameras or motion picture cameras.

The invention is embodied in a photographic camera which comprises shutter means movable between open and closed positions, means e.g., a reciprocable release) for opening the shutter means, electromagnet means arranged to close the shutter means in response to energization or deenergization of its winding, and means for determining the delay with which the electromagnet means closes the shutter means, Such delay determining means comprises an electronic control circuit whose output is connected or connectable with the electromagnet means and whose input is connectable with a timer unit including capacitor means and photosensitive receiver means, first resistor means (preferably including a fixed resistor) connectable with the input of the control circuit in place of the photosensitive receiver means prior to making of exposures with artificial illumination of the subject or scene, second resistor means (preferably including a variable resistor), and adjustable setting means arranged to influence the exposure of the photosensitive receiver means to scene light as a function of film speed prior to making of exposures in daylight and to electrically connect (preferably in series) the second resistor means with the first resistor means when the latter is connected with the input of the control circuit.

In accordance with a modification, the delay determining means includes the aforementioned control circuit, the aforementioned timer means, at least one auxiliary capacitor means, preferably fixed resistor means, adjustable setting means movable to and from a predetermined position corresponding to a given film speed to thereby connect the auxiliary capacitor means in parallel with the capacitor means of the timer means, and means for selectively connecting the capacitor means in series with the receiver means or in series with the resistor means. The latter connection is established for exposures with artificial illumination of the subject or scene.

2

The novel features which are considered as characteristic of the invention are set forth in particular in the appended claims. The improved exposure control itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
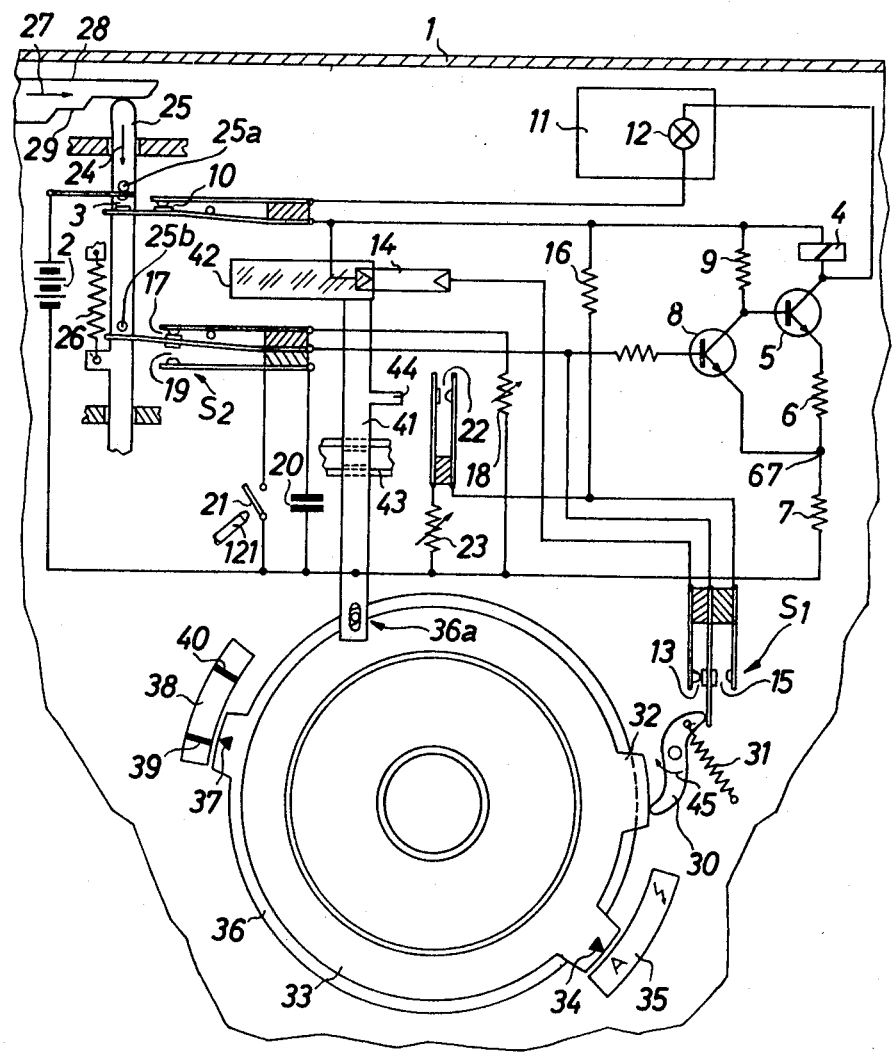
FIG. 1 is a fragmentary schematic vertical sectional view of a still camera including an exposure control which embodies the invention.

FIG. 1 illustrates a portion of a still camera which comprises a body or housing 1. This housing accommodates and/or supports the components of an automatic exposure control which includes a source 2 of direct current connectable in circuit with the remaining parts of the exposure control in response to closing of a master switch 3. An electromagnet 4 of the exposure control serves as a means for terminating the exposure, i.e., for closing the shutter. The electromagnet 4 is connected with the collector of a transistor 5 whose emitter circuit includes a voltage divider composed of two fixed resistors 6 and 7. The tap 67 between the resistors 6, 7 is connected with the emitter of a transistor 8 whose collector is connected with the base of the first transistor 5. The transistors 5, 8 form part of an electronic control circuit whose output (collector of the transistor 5) is connected with the electromagnet 4 and whose input is at the base of the transistor 8. The collector of the transistor 8 is further connected with one contact of the master switch 3 by way of a resistor 9 and a normally closed auxiliary switch 10. The numeral 12 denotes a signal generating device, preferably a small electric lamp, which is observable in the view finder 11 and is connected with one contact of the auxiliary switch 10 as well as with a tap between the electromagnet 4 and the collector of the first transistor 5, i.e., with the output of the electronic control circuit.

The exposure control further includes a two-way switching unit S1 having a first switch 13 and a second switch 15. The stationary contact of the switch 13 is connected with a photosensitive receiver 14 which is exposed to scene light. When the switch 13 is closed, the receiver 14 is connected to the base of the transistor 8, i.e., to the input of the electronic control circuit. When the unit S1 is actuated to open the switch 13 and to close the switch 15, the receiver 14 is disconnected and is replaced with a fixed resistor 16, i.e., the latter is then connected to the base of the transistor 8. The base of the transistor 8 is further connected with the movable central contact of a second two-way switching unit S2 which includes the switches 17 and 19. The switch 17 is normally closed and the switch 19 is normally open. When the switch 17 is closed, the base of the transistor 8 is connected with a variable indicator resistor or testing resistor 18, When the switch 17 is opened and the switch 19 closes, the testing resistor 18 is disconnected and is replaced with a capacitor 20 in parallel with a control switch 21 which can be closed by a portion 121 of the shutter. Thus, closing of the switch 19 results in connection of the capacitor 20 to the base of the second transistor 8 (input of the electronic control circuit). The capacitor 20 and the receiver 14 constitute a timer which determines the delay with which the electromagnet 4 closes the shutter during exposures in daylight.

A second variable resistor 23 is connectable with the base of the transistor 8 in response to opening of the switch 13 in the unit S1, i.e., in response to closing of the switch 15. The electrical connection between the base of the transistor 8 and the variable resistor 23 is completed in response to simultaneous closing of the switch 15 and a normally open switch 22. The camera further comprises a release including a first reciprocable release member 28 which can be moved by hand in the direction indicated by arrow 27 to thereby effect downward movement of a second reciprocable release member 25 (arrow 24). The release member 25 carries a post or trip 25a which closes the master switch 3 in response to movement of the member 25 in the direction indicated by arrow 24 and against the opposition of a relatively strong helical return spring 26. The release member 25 carries a second post or trip 25b which can cause the median contact of the unit S2 to open the switch 17 and to thereupon close the switch 19. The first release member 28 is provided with a cam face 29 which slides along the upper end of the release member 25 to effect the latter's movement in or counter to the direction indicated by arrow 24.

The median contact of the switching unit S1 is movable from the illustrated position by a trip 30 here shown as a two-armed lever which is biased in a clockwise direction (arrow 45) by a helical spring 31. One arm of the lever 30 engages the central contact of the switching unit S1 and its other arm can be engaged by a projection or lobe 32 of a ring-shaped selector 33 which is movable between two positions and includes a pointer or index 34. A fixedly mounted scale 35 has a first graduation or symbol (A) which indicates that the camera is set for automatic operation when the selector 33 assumes the illustrated position. When the selector 33 is turned in a counterclockwise direction so as to place the index 34 into registry with the thunderbolt symbol of the scale 35, the camera is set for operation with flash or with another suitable source of artificial light. If desired, the housing 1 can be provided with a customary accessory shoe (not shown) for the foot of an electronic flash or the like. The lever 30 is then adjacent to the shoe and maintains the switch 15 in closed position when the foot of the electronic flash is properly inserted into the shoe, i.e., when the camera is ready to make exposures with artificial illumination of the scene.

A second ring-shaped selector or setting member 36 is concentric with the selector 33 and has an index or marker 37 movable into registry with the graduation 39 or 40 of a second scale 38. The graduations 39, 40 indicate various film speeds. For example, the graduation 39 is representative of a film speed "22" (in DIN norms) and the graduation 40 indicates a film speed of "19" (also in DIN norms).

The setting member 36 is articulately connected (by a pin-and-slot connection 36a) with a motion transmitting rod 41 which is guided in a bearing 43 so that it is confined to sidewise movement. The upper end portion of the rod 41 carries a light obstructing element here shown as a grey wedge 42 which can overlie a greater or smaller portion of the photosensitive receiver 14, depending on the angular position of the setting member 36. The rod 41 is further provided with an extension or trip 44 which closes the switch 22 in response to placing of the index 37 into registry with the graduation 40 of the scale 38.

The Operation

I. It is assumed that the selector 33 is located in the illustrated position in which the index 34 registers with the symbol A of the scale 35. It is further assumed that the marker 37 of the setting member 36 is in registry with the graduation 39 of the scale 38, i.e., that the camera is loaded with film having a speed of "22" (in DIN norms). It is also assumed that the intensity of scene light is sufficient for making of exposures with the camera held by hand.

The switch 13 of the unit S1 is closed because the index 34 does not register with the thunderbolt symbol of the scale 35 and the contact 15 is therefore open. The light obstructing element 42 is held in the illustrated position in which it does not affect the exposure of the photosensitive receiver 14 to scene light. The switch 22 is open.

To make an exposure, the user of the camera moves the first release member 28 in the direction indicated by arrow 27 whereby the cam face 29 causes the second release member 25 to move in the direction indicated by arrow 24 and to stress the return spring 26. Such movement of the release member 25 results in closing of the master switch 3 (by way of the trip 25a) which connects the positive pole of the energy source 2 with the photosensitive receiver 14, lamp 12, resistors 16, 9 and electromagnet 4. The base of the transistor 8 (input of the electronic control circuit) is connected with the voltage divider including the photosensitive receiver 14 and the testing resistor 18. The selected resistance of the resistor 18 is such that the lamp 12 lights up and produces a visible signal when the intensity of scene light is below a predetermined minimum value. At this value of the intensity of scene light, the resistance of the receiver 14 to the flow of electric current is such that the shutter furnishes an exposure time which is still satisfactory for making of an exposure with the camera held by hand. For example, the maximum length of the exposure time at which a hand exposure can be made without unduly influencing the quality of the exposure by camera shake can be selected as one-thirtieth of a second.

Since it is assumed that the intensity of scene light is satisfactory, the resistance which the receiver 14 offers to the flow of electric current is such that the base potential of the transistor 8 with reference to emitter potential is positive. Thus, the transistor 8 conducts current and, due to voltage drop at the resistor 9, the base potential of the transistor 5 with reference to the emitter potential is negative so that the transistor 5 blocks the flow of current and prevents energization of the electromagnet 4. The transistor 5 also prevents completion of the circuit of the signal lamp 12.

The use continues to move the release member 25 in the direction indicated by arrow 24 to thereby open the switch 10 which disconnects the signal lamp 12 from the positive pole of the energy source 2. Further downward movement of the release member 25 causes the trip 25b to open the switch 17 and to thereupon close the switch 19. The testing resistor 18 is disconnected and is replaced with the capacitor 20 which is then in series with the photosensitive receiver 14.

The control switch 21 is assumed to be closed. The portion 121 of the shutter is arranged to close the control switch 21 in response to cocking of the shutter; this control switch opens again in response to opening of the shutter, i.e., when the shutter blade or blades permit scene light to reach an unexposed film frame. Such opening of the shutter is caused by the release member 25 on closing of the switch 19. Thus, opening of the control switch 21 takes place simultaneously with the start of an exposure. At such time, the base potential of the transistor 8 with reference to the emitter potential is negative so that the transistor 5 conducts current to effect energization of the electromagnet 4. The potential at the capacitor 20 rises as a function of the time constant of the elements 14 and 20. When the potential to which the transistor 8 responds is reached, the transistor 8 begins to conduct current and the transistor 5 blocks the flow of current to effect deenergization of the electromagnet 4 which thereby causes the shutter to close and to terminate the exposure. The manner in which the blade or blades of the shutter close in response to deenergization of the electromagnet 4 forms no part of the present invention.

II. It is assumed that the intensity of scene light is insufficient for making of exposures with the camera held by hand. When the user causes the release member 25 to move in the direction indicated by arrow 24, the master switch 3 is closed and the circuit of the exposure control is completed to the positive pole of the energy source 2. The resistance of the photosensitive receiver 14 is high because the intensity of scene light is low; therefore, the potential at the testing resistor 18 is less than that which is necessary to cause the transistor 8 to conduct current. Thus, the transistor 8 blocks but the transistor 5 permits the flow of current. The lamp 12 lights up and this indicates to the user that the exposure should not be made with the camera held by hand, i.e., that the user should employ a flash unit or another suitable source of artificial light. The user then releases the member 28 and changes the position of the selector 33 so that the index 34 registers with the thunderbolt symbol on the scale 35. Such angular movement of the selector 33 causes the projection 32 to move away from the adjacent arm of the lever 30 so that the latter turns in the direction indicated by arrow 45 (under the action of the spring 31) and opens the switch 13 to simultaneously close the switch 15. Thus, the photosensitive receiver 14 is disconnected and is replaced with the fixed resistor 16 which is then connected to the base of the transistor 8 (input of the electronic control circuit). When the user thereupon depresses the release member 25 to first close the master switch 3 and to thereupon open the switch 10, the lamp 12 is disconnected from the energy source 2. Furthermore, the ensuing opening of the switch 17 results in disconnection of the testing resistor 18 and, when the switch 19 closes, the capacitor 20 is connected in series with the fixed resistor 16. The control switch 21 opens in the aforedescribed manner in response to movement of the shutter blade or blades to open position. This starts the exposure simultaneously with closing of a conventional synchronizing switch (not shown) which fires a flashbulb or completes the circuit of an electronic flash. The timing of firing of the flash is selected in such a way that the intensity of artificial light reaches a peak value simultaneously with full opening of the shutter.

When the switch 19 closes (i.e., when the capacitor 20 is connected in the exposure control circuit), the transistor 8 blocks and the transistor 5 permits the flow of electric current. Thus, the electromagnet 4 is energized. After elapse of an interval which is determined by the time constant of the fixed resistor 16 and capacitor 20, the transistor 8 begins to conduct and the transistor 5 blocks the flow of current to deenergize the electromagnet 4 and to thus terminate the exposure. This time constant (when the film speed corresponds to that indicated by the graduation 39 on the scale 38) is selected in such a way that the shutter furnishes an exposure time of, for example, one-sixtieth of a second, i.e., an exposure time which is sufficiently short to permit the making of exposures with the camera held by hand.

When the user thereupon releases the member 28, the latter moves counter to the direction indicated by arrow 27 (under the action of a suitable spring, not shown), whereby the spring 26 moves the release member 25 upwardly to the position shown in the drawing to effect opening of the master switch 3 and to thus open the circuit of the energy source 2.

III. If the camera contains a film whose sensitivity is "19" (in DIN norms), the setting member 36 is turned to move the marker 37 into registry with the graduation 40 of the scale 38. Such angular movement of the setting member 36 causes the connection 36a to move the motion transmitting member 41 in a direction to the right, as viewed in the drawing, and to place the light obstructing wedge 42 in front of the photosensitive receiver 14. At the same time, the extension 44 of the motion transmitting member 41 closes the switch 22.

It is assumed that the selector 33 is held in a position in which the index 34 registers with the thunderbolt symbol of the scale 35. Thus, when the user depresses the release member 25 to close the switch 19, the resistor 23 is connected in series with the fixed resistor 16 and in parallel with the capacitor 20. The latter can only be charged to a potential which is lower than that between the terminals of the energy source 2, namely, to a potential which corresponds to the divider voltage of the voltage divider including the resistors 16 and 23. Thus, the rise in capacitor potential is less than in the aforedescribed examples. Consequently, the transistor 8 begins to conduct current with a certain delay. The resistance of the resistor 23 is such that, when the film speed is "19" (in DIN norms), the shutter furnishes an exposure time which is twice the exposure time furnished by the shutter when the film speed is "22" and the exposure is made with flash. With reference to the exposure time given in the example (II) above, the new exposure time is one-thirtieth of a second. All other stages in the making of an exposure with artificial illumination of the scene at a film speed of "19" are carried out in the same way as described above.

If the user wishes to make exposures in daylight while the camera contains film having a speed of "19," the setting member 36 remains in the position in which the marker 37 registers with the graduation 40 of the scale 38 so that the light obstructing wedge 42 remains in front of the photosensitive receiver 14. Therefore, the exposure time furnished by the shutter is longer than the exposure time given in the example (I) above, provided that the intensity of scene light is the same.

It is further clear that the camera can be provided with means for automatically moving the wedge 42 to one of several positions each of which corresponds to a different film speed. This can be achieved by providing the camera with a scanning device which tracks coding projections, notches or like indicia on a magazine, cassette or cartridge for film and which automatically determines the position of the wedge 42 as a function of film speed. For example, the setting member 36 can form part of an operative connection between the wedge 42 and the just mentioned scanning device.

Figure 1A:
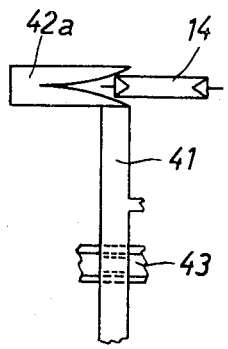
FIG. 1a illustrates a detail in a modified camera.
Figure 1B:
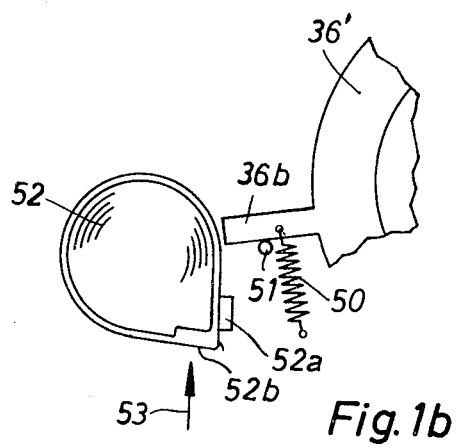
FIG. 1b illustrates a detail in a further camera.

As shown in FIG. 1b, the selector 36' has a scanning arm 36b which is biased against a stop 51 in the camera body by a helical spring 50. The scanning arm 36b extends into the path of movement of a coding projection 52a on a cartridge or magazine 52 which is being inserted into the camera body by moving in the direction indicated by the arrow 53. The distance between the face 52b of the cartridge 52 and the coding projection 52a is indicative of the speed of photographic film in the cartridge 52. Thus, the angular position of the selector 36' (and hence the position of the light obstruction element 42 with reference to the photosensitive receive 14) is a function of the speed of film in the cartridge 52.

The resistor 23 is adjusted when the camera is to use film having a third speed (other than those indicated by the graduations 39 and 40). Such adjustment of the resistor 23 can be effected by the setting member 36. If the resistors 16 and 23 are in series with the capacitor 20, the setting member 36 can be used to adjust the resistor 23 whenever the camera is loaded with film whose sensitivity is different from a given sensitivity, e.g., when the member 36 moves the marker 37 from the illustrated position into registry with the graduation 40. The resistor 23 can be connected in parallel with the capacitor 20 and in series with the resistor 16.

An important advantage of the improved exposure control is that the setting member 36 which influences the exposure of the photosensitive receiver 14 to scene light as a function of the film speed (by way of the light obstructing device 42) also serves as a means for controlling the switch 22 and hence the connection or disconnection of the variable resistor 23 from the control circuit. Thus, a single setting member (36) suffices to influence the photosensitive receiver 14 as a function of film speed when the intensity of scene light is satisfactory as well as to adjust the control circuit (by closing the switch 22 and/or by changing the resistance of the variable resistor 23) as a function of film speed when the intensity of scene light is unsatisfactory for exposures without artificial illumination. Many presently known cameras are designed to furnish a fixed exposure time (e.g., one-thirtieth of a second) for all exposures with artificial illumination of the scene, mainly because the interval of light emission by a flash unit is normally of the same duration (one-thirtieth of a second). The exposure control of the present invention can furnish shorter exposure times for exposures with artificial illumination of the subject or scene, i.e., only a portion of light produced by a flash unit can be used at times to illuminate the scene while the shutter is open. The arrangement is preferably such that the exposure time is relatively long (e.g., one-thirtieth of a second) when the film speed is low. When the film speed is higher, the resistor 23 is adjusted to insure that the exposure control furnishes a shorter exposure time, i.e., only a portion of artificial light furnished by a flash unit is then used to illuminate the scene while the shutter is open. The adjustment, connection or disconnection of the resistor 23 involves minimal expenditures in parts. Also, the resistor 23 can be adjusted while the camera contains film of a given sensitivity whereby such adjustment results in a change of exposure time.

Another advantage of the improved camera is that the focusing ring which is used to adjust the exposure control as a function of the distance from the subject can be directly coupled to the diaphragm setting ring because the latter need not be adjusted for the purpose of considering the film speed.

It is also within the purview of the invention to employ in the circuit of the exposure control at least one auxiliary capacitor (not shown) which is connectable in parallel with the capacitor 20 and serves to account for a certain film speed. The auxiliary capacitor or capacitors can be connected in parallel with the capacitor 20 by a suitable setting member, such as the member 36, and the capacitors are then in series with the photosensitive receiver 14 or with the fixed resistor 16 for exposures with flash. Such construction also brings about the advantage that a single setting member suffices to adjust the exposure control as a function of film speed for operation at a satisfactory intensity of daylight or for operation with artificial illumination of the scene. It is normally preferred to employ a large auxiliary capacitor when the camera is loaded with low-speed film. When the camera contains film whose sensitivity is very high, the fixed resistor 16 is connected in series only with the capacitor 20. Thus, the exposure control is then capable of furnishing an exposure time which is shorter than the exposure time used when the camera contains film of lowest sensitivity. By using the capacitor 20 and two auxiliary capacitors, the exposure control can insure proper exposure of three types of film. It is clear that the exposure control which is shown in the drawing can also be used in cameras which accept three or more types of film.

The wedge 42 can be replaced with an auxiliary diaphragm 42a (see FIG. 1a) or with another suitable light obstructing device.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended:

1. In a photographic camera, a combination comprising shutter means movable between open and closed positions; means for opening said shutter means; electromagnet means arranged to assume an energized condition and a deenergized condition and to close said shutter means in one of said conditions; and means for determining the delay with which said electromagnet means closes said shutter means, including an electronic control circuit having an input and an output connected with said electromagnet means, timer means including capacitor means and photosensitive receiver means connectable with said input, first resistor means connectable with said input in place of said receiver means prior to making of exposures with artificial illumination, second resistor means, and adjustable setting means arranged to influence the exposure of said receiver means to scene light as a function of the speed of film in the camera prior to making of exposures in daylight and to electrically connect said second resistor means with said first resistor means when the latter is connected with said input.

2. A combination as defined in claim 1, wherein said first resistor means comprises a fixed resistor and said second resistor means comprises a variable resistor whose resistance is variable as a function of the film speed.

3. A combination as defined in claim 2, wherein said setting means is arranged to connect said variable resistor in series with said fixed resistor when the latter is connected with the input of said control circuit.

4. A combination as defined in claim 1, wherein said second resistor means is connectable in series with said capacitor means and said first resistor means.

5. A combination as defined in claim 1, wherein said second resistor means is connectable in parallel with said capacitor means and in series with said first resistor means.

6. A combination as defined in claim 1, wherein said photosensitive receiver means includes a photoelectric resistor.

7. A combination as defined in claim 6, further comprising light obstructing means operatively connected with said setting means to influence the exposure of said photoelectric resistor to scene light in response to adjustment of said setting means.

8. A combination as defined in claim 7, wherein said light obstructing means comprises an adjustable diaphragm.

9. A combination as defined in claim 7, wherein said light obstructing means comprises a grey wedge.

10. A combination as defined in claim 1, wherein the film is stored in magazines provided with coding means representing the speed of film therein and wherein said setting means is adjustable by such coding means in response to insertion of a magazine into the camera.

11. A combination as defined in claim 1, wherein said setting means is accessible for manual adjustment.

12. A combination as defined in claim 11, wherein said setting means comprises a ring-shaped setting member.

13. A combination as defined in claim 1, further comprising signal generating means connectable with said output, testing resistor means connectable with said input in place of said capacitor means to effect the generation of a signal by way of said signal generating means at an intensity of scene light which is below a predetermined minimum value, and actuating means for respectively temporarily connecting said signal generating means with said output and said receiver means and said testing resistor means with said input.

14. A combination as defined in claim 13, wherein said actuating means comprises a camera release.

15. A combination as defined in claim 14, wherein said camera release constitutes said means for opening the shutter means.

* * * * *